Oct. 5, 1965  H. W. RYNER  3,209,807

POSITIVE RETENTION CAPTIVE SCREW

Filed Nov. 12, 1963

INVENTOR.

HAL W. RYNER

BY

ATTY.

United States Patent Office 3,209,807
Patented Oct. 5, 1965

3,209,807
POSITIVE RETENTION CAPTIVE SCREW
Hal W. Ryner, San Mateo, Calif., assignor, by mesne assignments, to Automatic Electric Laboratories, Inc., Northlake, Ill., a corporation of Delaware
Filed Nov. 12, 1963, Ser. No. 323,035
1 Claim. (Cl. 151—69)

The invention relates in general to captive screw assemblies and in particular to the design of screws used in captive screw assemblies and to methods for effecting capture of a screw.

In some prior art captive screw assemblies, positive capture of the screw is accomplished by turning a retaining washer over the screwthreads onto the shank of the screw after inserting the shank into a standoff having a constricted end. In other assemblies positive capture is effected by pushing a flexible grooved collar located on the shank of the screw through the constricted end of a standoff. The disadvantage of these prior art assemblies is that capture of the screw can be overcome by turning the screw out of the standoff, the retaining washer being turned back over the screwthreads, in the former type, and by pulling hard on the screwhead in the latter type. This disadvantage limits the effectiveness and the utility of these types of assemblies, especially when it is desirable to use the assembly as a knob to pull out a drawer as well as to fasten the drawer in a cabinet.

Therefore, it is an object of the invention to provide a novel screw design which enables more positive and permanent capture of the screw in a captive screw assembly.

It is a further object of the invention to provide a method of using a screw of novel design to effect positive and permanent capture of the screw in the assembly.

The invention features a screw with a conical recess surrounding the shank on the underside of the screwhead which allows the screw to be used as a means for forming a constricted end on a bushing, thereby capturing the screw in the bushing.

Other objects and features and a more complete understanding of the invention will be obtained by referring to the following description in conjunction with the drawing, in which.

Figure 1:
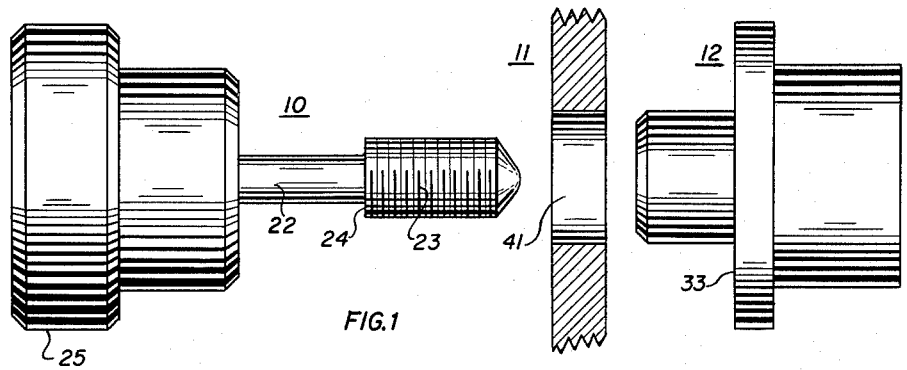
FIG. 1 is an elevational view showing the pieces in position for assembly.
Figure 2:
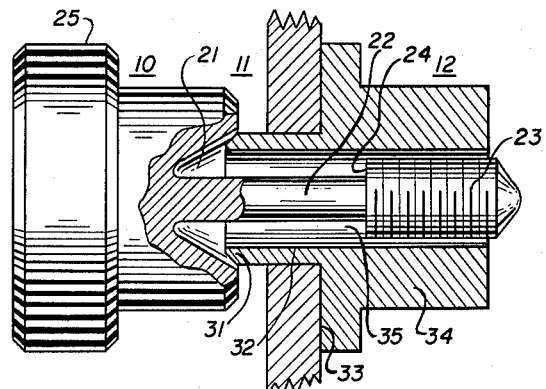
FIG. 2 is an elevational view showing the pieces partially assembled with the bushing in half section and a portion of the screwhead cut away to exhibit the shape of the conical recess.

Referring to the drawing, reference character 10 designates a thumbscrew which may be formed of steel; reference character 11 designates a thin metal plate or support structure; and reference character 12 designates a bushing which may be made of brass.

The thumbscrew 10 has a knurled head 25, a shank 22 with a threaded portion 23 which varies the diameter of the shank and thereby forms the shoulder 24. The underside of the screwhead has a conical recess 21 therein defining a skirt portion which concentrically surrounds the shank.

The bushing 12 has a hollow portion 35 receiving the shank 22 of the screw 10. The thin-walled portion 32 of the bushing is received by the hole 41 in the plate 11. The end portion 31 of the thin-walled portion 32 is initially straight and is received by the conical recess 21 in the thumbscrew 10. The shoulder 33 abuts one side of the plate 11. The thick-walled portion 34 gives structural rigidity to the bushing.

Figure 3:
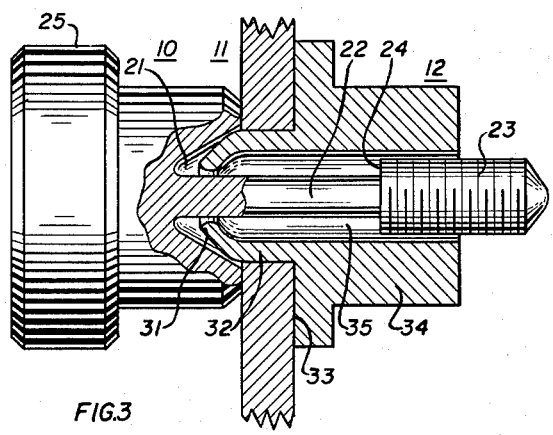
FIG. 3 is an elevational view showing the completed assembly.

The thumbscrew, plate, and bushing are assembled in the following manner:

The thin-walled portion 32 of the bushing 12 is inserted in the hole 41 in the plate 11 until the shoulder 33 on the bushing abuts one side of the plate. The shank 22 of the thumbscrew 10 is inserted in the hollow portion 35 of the bushing 12. The conical recess 21 on the underside of the thumbscrew is placed over the end portion 31 of the bushing to serve as a forming means. The end portion 31 is then forced into the conical recess 21 by applying a clamping force between the bushing and the thumbscrew. This causes the end portion 31 to constrict toward the shank 22 of the thumbscrew as shown in FIG. 3. The thumbscrew 10 is thereby captured in the bushing because the shoulder 24 on the shank 22 of the thumbscrew interferes with the constricted end portion 21 of the bushing 12 if an attempt is made to pull out the screw. The clamping force may be applied by using a back-up vise or similar tool.

After capture is effected and the clamping tool is removed, the thumbscrew 10 is free to move laterally, but the constricted end portion 31 on the bushing 12 prevents the thumbscrew from being pulled out of the bushing, unless force greater than that which could be applied by hand is used. Thus the screw is positively and permanently captured in the bushing, and this capture has been accomplished by using the thumbscrew design disclosed herein.

While the above description discloses one embodiment of the invention, it is to be understood that numerous changes could be made without departing from the scope of the invention.

What is claimed is:

A captive screw type fastener for mounting on a support structure having front and rear surfaces and having an aperture therethrough, said fastener comprising, in combination:

a hollow bushing having at the front end a relatively thin-walled portion and at the rear end a relatively thick-walled portion defining a shoulder at the junction therebetween, each of said portions having a substantially continuous cylindrical configuration, said thin-walled portion being insertable in said aperture and being of a length such that its free end extends beyond a front surface of said support structure with said shoulder abutting a rear surface of said support structure; and a screw having a head and a shank, said shank being insertable in said bushing and having a threaded portion and a shoulder spaced from the head, said head having at its rear end a substantially conical recess defining a skirt portion which concentrically surrounds said shank and provides means upon application of an axially directed clamping force for permanently constricting said free end of said thin-walled portion to a diameter such that said end interferes with said shoulder and prevents removal of said shank from said bushing, said skirt portion being of a length such that said rear end of said head engages a front surface of said support structure upon constricting said free end of said bushing.

References Cited by the Examiner

UNITED STATES PATENTS

| 1,627,471 | 5/27 | Wadsworth | 151—69 |
| 2,563,992 | 8/51 | De Grave | 29—520 |

FOREIGN PATENTS

| 27,896 | 9/11 | Great Britain. |
| 161,489 | 11/57 | Sweden. |

CARL W. TOMLIN, Primary Examiner.

EDWARD C. ALLEN, Examiner.